United States Patent Office 2,879,535
Patented Mar. 31, 1959

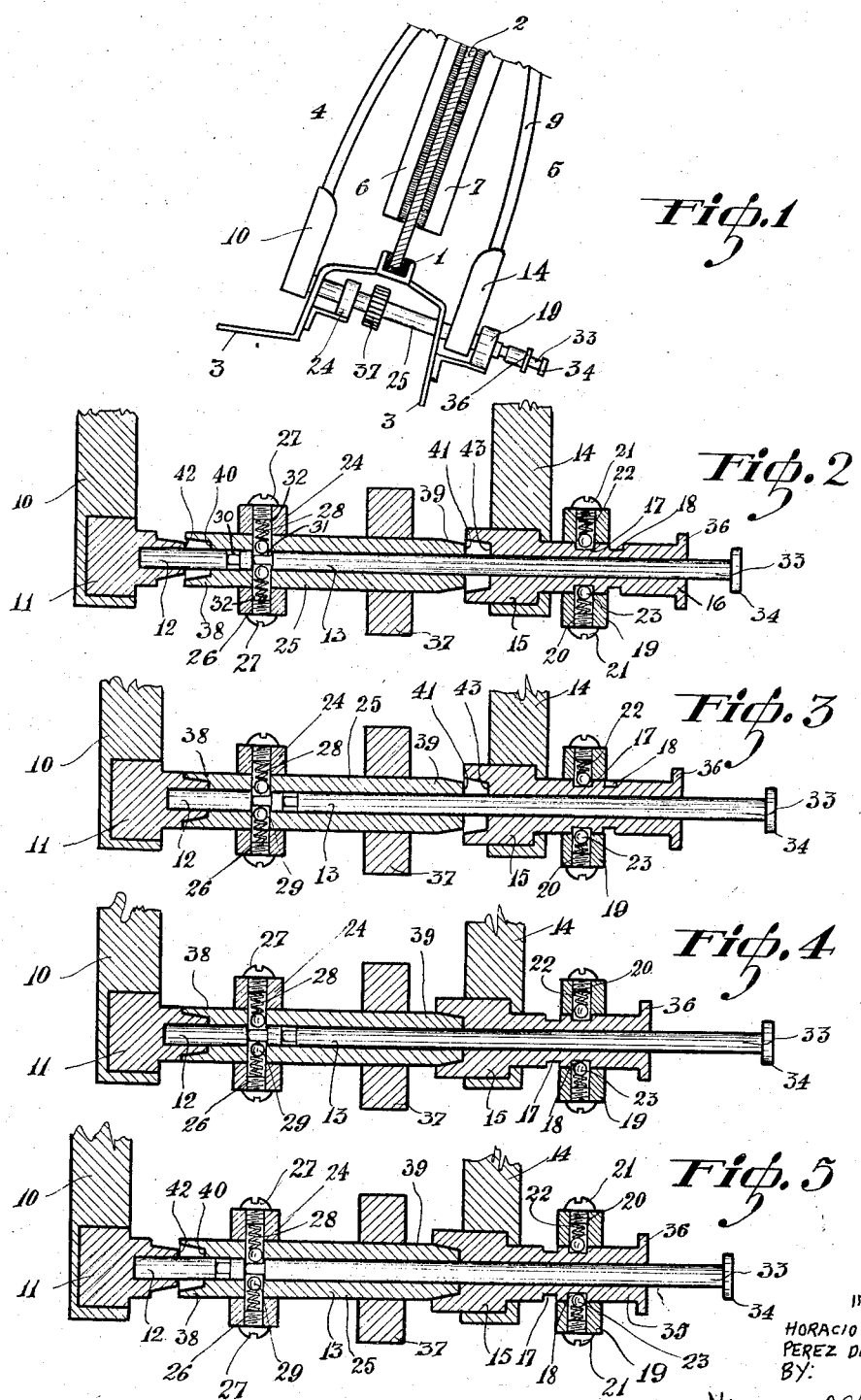

2,879,535

WIND-SCREEN WIPER OF COMBINED EFFECT

Horacio Gabriel Perez del Cerro, Buenos Aires, Argentina

Application December 9, 1953, Serial No. 397,170

9 Claims. (Cl. 15—256)

The present invention refers to windshield wipers and more particularly to those having an arrangement for wiping opposite sides of the windshield pane.

Windshield wipers having a rubber squeegee carried by an oscillating arm are well known. The oscillating movement thus imparted to the squeegee clears rain water from the outside surface of the glass pane of the windshield which otherwise would blur or obscure the drivers vision of the road.

In certain cases, it has been proposed to have a second wiper arm mounted on the shaft that oscillates the outer wiper arm in such a manner that the squeegee carried by this second arm will wipe the corresponding inner surface of the pane. In this manner a thorough cleansing of the windshield is obtainable, not only with regard to the rain water collecting on the outer surface of the pane, but also with regard to deposits on the inner surface of the windshield such as may occur due to the condensation of water vapor thereon when the outside temperature is appreciably lower than that in the interior of the vehicle.

However, the mounting of the two oscillating wiper arms with their squeegees directly on one and the same drive shaft of the device has the disadvantage that it necessitates the simultaneous movement of both squeegees.

In practice, however, it frequently happens that only one side of the windshield needs being wiped or cleaned, as it frequently happens that although it may be raining, the inside surface of the glass pane nevertheless does not get dirtied, or on the other hand, it may not be raining but the inside surface of the pane gets dirty, so that therefore, the operation of the outside wiper arm is not required. In each instance, the simultaneous operation of the two wiper arms means an unnecessary consumption of extra energy and wear and tear of the parts, and furthermore, the wiping action of the squeegee when the surface of the pane is not sufficiently wet produces a contrary effect, in that it further diminishes the visibility through the pane.

The windshield wiper according to this invention provides a dual wiper device of extreme simplicity, which permits not only the simultaneous starting or stopping of both wiper arms, but also the independent operation of either the outside or the inside wiper arm as needed.

The fundamental characteristic of the invention lies in a device which has a drive shaft to impart oscillation, on which are mounted two tubular pieces or sleeve members mounted coaxially and cooperative with supporting bearings, the respective wiper arms carrying the squeegees being rigidly fixed respectively to the shaft and to one of the tubular pieces, while the other tubular piece is operatively connected to and driven by the driving organ or motor of the device, together with clutch mechanisms, capable of being operated separately, effective between the above mentioned driving tubular piece and the respective elements on which the wiper arms are mounted.

Although similar results may be obtained by various ways of combining the drive shaft and the two tubular pieces with the oscillating wiper arms and the driving element or organ of the device, in practice it is more convenient that the shaft have one of its extremities fixed to the outside wiper arm and adjacent to the tubular piece or sleeve through which the shaft extends and which is operatively connected to the driving means of the device, while on the opposite extremity of the shaft the other tubular piece or sleeve is mounted carrying the inside wiper arm.

In accordance with this arrangement of the basic elements of the improved windshield wiper, a complementary characteristic of a structural order, consists in that the tubular piece which is directly joined to the driving element of the device is mounted on a bearing capable of allowing its oscillating movement but at the same time impeding it to slide longitudinally, being provided at its extremities, with various toothed zones which face one another and are capable of coupling with other toothed zones provided in a widening of the shaft of the apparatus and in the adjacent extremity of the other tubular piece for supporting the brush, this tubular piece as well as the above mentioned axis being mounted on bearings capable of permitting the oscillating movement and a partial longitudinal displacement, with retaining means in two of the sliding positions which correspond respectively, to its connected and disconnected positions with respect to the tubular piece which is directly connected to the driving organ of the apparatus.

These means of retention in two positions for the shaft and the tubular piece on which the wiper arms for the outside and inside cleaning are fixed will be preferably constituted by a couple of pairs of circumferential channels provided in its external surface, adjacently to a projection capable of bearing or pressing elastically on the said channels.

Another characteristic of the invention, of a constructural order, is that the inside extremity of the shaft of the device as also the adjacent extremity of the tubular piece which supports the squeegee mounted on it, are provided with circumferential ribs capable of constituting the means for manual displacement for its movement between the connected and disconnected positions with respect to the driving tubular piece of the apparatus.

Other characteristics and constructive details may be appreciated with the aid of the drawings which accompany the present specification and claims, which present one of the preferable forms for the practical realization of the fundamental idea, and which as is only logical, may be varied. Mention of these is made in the following in order to make the given concepts clear, and at the same time demonstrating the practicability of the invention.

Figure 1 represents a partial cross section made according to a plane perpendicular to the windshield adjacent to the site of application of the windshield wiper.

In Figure 2 the constitutive part of the mechanism of the windshield wiper may be partially seen in a longitudinal cross-section, and in a disconnected position of the two oscillating lever arms.

Figure 3 represents in analogous manner the disposition of parts which the mechanism assumes when the shaft of same has been displaced to the position of operating the outside wiper.

Figure 4 corresponds, in an equivalent longitudinal cross section, to the position of operation of both wipers of the apparatus.

And lastly, Figure 5, gives details of a similar longitudinal cross section to the three previous ones, differing in this case in that it is now the inside wiper which assumes the position of being operated.

In the corresponding description use will be made of numbers to identify the various parts of the whole, and it is understood that the same numbers indicate similar or equivalent elements, although they may appear in different figures.

In Figure 1 may be seen the lower portion 1 of the channel for holding the glass pane of the windshield 2 which channel is fixed on the adjacent supporting structure 3. The outside and inside surfaces with regard to the vehicle cabin (not shown), being 4 and 5 respectively. In accordance with this, 6 and 7 are the outside and inside wipers or squeegees respectively, which are mounted in an articulated manner on the corresponding wiper arms 8 and 9.

The lower end 10 of the outside arm 8 is fixed on a core 11 which is rigidly joined to the extremity 12 of the shaft 13, whereas the lower end 14 of the inside arm 9 is similarly joined to the widening 15 of the tubular piece 16. This tubular piece 16 presents two circumferential channels 17 and 18 at intermediate points of its length, and is mounted on a bearing 19 fixed to the structure 3, and with respect to which it can turn. The bearing 19 presents a pair of opposed radial perforations 20, in which are placed a couple of screws 21 which hold a pair of springs 22 which press against steel balls 23.

In accordance with this, the tubular piece 16 may slide longitudinally with respect to the bearing 19, between the extreme positions which coincide with the lodging of the roller balls 23 in the channels 17 or 18 respectively, which at the same time constitute the retention means in the above mentioned position.

In a second bearing 24, also fixed to the structure 3, the tubular piece 25 is mounted so that it may rotate. The said bearing 24 also has radial perforations 26 where the screws 27 hold the springs 28 which press elastically on the balls 29 against the adjacent zone of the shaft 13 where the two circumferential channels 30 and 31 are provided. To this effect, the perforations 26 are prolonged internally in tubular extensions which go through the channels 32 of the piece 25, as guiding elements for the roller balls 29. These balls 29, in a similar manner as with the balls 23, serve as stops for the retention of the extreme positions of the shaft 13 in its longitudinal sliding movement with respect to the piece 25 which can only oscillate in a rotary manner with respect to the bearing 24. For the manual longitudinal displacement of shaft 13, the inside extremity 33 of same has a circumferential rib 34 while the adjacent end 35 of the tubular piece 16, has another equivalent rib 36.

The tubular piece 25 has a pinion 37 by means of which it receives the rotating oscillatory movement from the driving organ or element of the windshield wiper (not illustrated) and at its extremities 38 and 39 form corresponding toothed zones 40 and 41 which face other toothed coupling zones 42 and 43 provided in the core 11 and in the widening 15 of the tubular piece 16, in the manner of a clutch of piece 16 with the shaft 13 and piece 16, respectively.

Consequently, when the driving element or organ applied to the windshield wiper is put into operation, it communicates, by means of pinion 37, a rotating oscillatory movement to the tubular piece 25. If, as illustrated in Figure 2, the steel balls 29 and 23 press against the channel 31 of shaft 13 and 17 of piece 16 respectively, then the toothed coupling zones 42, 40 and 41—43 will be separated, and the movement of piece 25 will not be transmitted to shaft 13 nor to piece 16.

On the other hand, if shaft 13 is displaced longitudinally by manual traction applied to the rib 34 of its extremity 33 until the steel balls 29 coincide with channel 30 (Figure 3) the dented or toothed zones 42 and 40 will reciprocally engage and the shaft 13 will oscillate together with piece 25, and in this manner the independent operation of outside wiper or squeegee 6 will be produced. In an analogous manner (Figure 5) the independent operation of the inside wiper or squeegee 7 may be produced, by the reciprocal engagement of the toothed zones 41 and 43.

In Figure 4, the manner of connecting the parts which correspond to the simultaneous operation of both wipers 6 and 7 may also be appreciated.

In the operation of the device, if it is desired to operate only the outside wiper, the shaft 13 is shifted axially, by grasping the end or rib 34 thereof, from the inoperative position of Fig. 2 to the operative position of Fig. 3. Such axial movement engages the outside wiper arms to the tubular piece 25 actuated by the pinion 37 to oscillate the outside wiper arm.

If the inside wiper alone is to be operated, starting from the inoperative condition of Fig. 2, the tubular piece 16 is shifted axially, by grasping the end or rib 36, into the operative position shown in Fig. 5 whereby it engages the adjacent end of tubular piece 25 which in turn will impart oscillating movement to the inside wiper arm.

Consequently, if both wipers are to be operated simultaneously, both the shaft 13 and the tubular piece 16 may be shifted axially from their respective inoperative positions of Fig. 2 in opposite directions to their respective operative positions shown in Fig. 4.

It is desired to state clearly that the foregoing description is only of one of the forms preferable for the realization of the invention, and in no way limits it, but demonstrates it in the form of an example, since the general form of the constitutive elements of the apparatus, the type of clutch between said elements as also the disposition for its support may vary in order to adapt themselves to the conditions best suited.

It is therefore evident that, diverse constructive modifications and details may be introduced without by that reason departing from the sphere or scope of the present invention, which has been already determined in the clauses of the claims which follow this specification.

What I claim is:

1. A clutch mechanism for actuating wipers or the like arranged on opposite sides of a pane of transparent material or the like, comprising, in combination, a driving member mounted for turning movement and having at least two driving engaging portions; a first driven member having a first driven engaging portion and being mounted for turning movement and for axial movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; a second driven member having a second driven engaging portion and being mounted for turning movement and for axial movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; and first and second moving means connected to said first and second driven members, respectively, for moving the same axially toward and away from their respective operative positions whereby the first and second wipers may be driven independently of each other by said driving member so that, as desired, either, neither or both of the wipers may be actuated.

2. A clutch mechanism for actuating wipers or the like arranged on opposite sides of a pane of transparent material or the like, comprising, in combination, a driving member mounted for turning movement and having at least two driving engaging portions; a first driven member having a first driven engaging portion and being adapted for turning movement and for axial movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; a second driven member having a second driven engaging portion and being mounted for turning movement and for axial movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; and first and second moving means arranged on the same side of the pane and connected to said first and second driven members, respectively, for moving the same axially toward and away from their respective operative positions whereby the first and second wipers may be driven independently of each other by said driving member so that, as desired, either, neither or both of the wipers may be actuated.

3. A clutch mechanism for actuating wipers or the like arranged on opposite sides of a pane of transparent material or the like, comprising, in combination, a driving member mounted for turning movement about a turning axis traversing the plane of the pane and having at least two driving engaging portions; a first driven member having a first driven engaging portion and being mounted for turning movement and for movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; a second driven member having a second driven engaging portion and being mounted for turning movement and for movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; and first and second moving means arranged on the same side of the pane and connected to said first and second driven members, respectively, for moving the same axially toward and away from their respective operative positions whereby the first and second wipers may be driven independently of each other by said driving member so that, as desired, either, neither or both of the wipers may be actuated.

4. A clutch mechanism for actuating wipers or the like arranged on opposite sides of a pane of transparent material or the like, comprising, in combination, a driving member mounted for turning movement about a turning axis traversing the plane of the pane and having at least two driving engaging portions; a first driven member having a first driven engaging portion and being mounted for turning movement about said axis and for axial movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; a second driven member having a second driven engaging portion and being mounted for turning movement about said axis and for axial movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; and first and second moving means arranged on the same side of the pane and connected to said first and second driven members, respectively, for moving the same axially toward and away from their respective operative positions whereby the first and second wipers may be driven independently of each other by said driving member so that, as desired either, neither or both of the wipers may be actuated.

5. A clutch mechanism for actuating wipers or the like arranged on opposite sides of a pane of transparent material or the like, comprising, in combination, a tubular driving member mounted for turning movement about a turning axis traversing the plane of the pane and having at least two driving engaging portions; a first driven member having a first driven engaging portion and being mounted for turning movement about said axis and for axial movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; a second driven member having a second driven engaging portion and being mounted for turning movement about said axis and for axial movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; and first and second moving means arranged on the same side of the pane and connected to said first and second driven members, respectively, for moving the same axially toward and away from their respective operative positions whereby the first and second wipers may be driven independently of each other by said driving member so that, as desired, either, neither or both of the wipers may be actuated, one of said moving means extending through said tubular driving member.

6. A clutch mechanism for actuating wipers or the like arranged on opposite sides of a pane of transparent material or the like, comprising, in combination, a driving member mounted for turning movement about a turning axis traversing the plane of the pane and having at least two driving engaging portions; a first driven member having a first driven engaging portion and being mounted for turning movement about said axis and for axial movement toward and away from an operative position wherein said first driven engaging portion of said first driven member is in engagement with one of said driving engaging portions of said driving member so that said driving member drives said first driven member, said first driven member being adapted to be connected to a first wiper for wiping one side of the pane; first retaining means for selectively retaining said first driven member in said operative position thereof and out of said operative position thereof, as desired; a second driven member having a second driven engaging portion and being mounted for turning movement about said axis and for axial movement toward and away from an operative position wherein said second driven engaging portion of said second driven member is in engagement with the other of said driving engaging portions of said driving member so that said driving member drives said second driven member, said second driven member being adapted to be connected to a second wiper for wiping the other side of the pane; second retaining means for selectively retaining said second driven member in said operative position thereof and out of said operative position thereof, as desired; and first and second moving means arranged on the same side of the pane and connected to said first and second driven members, respectively, for moving the same axially toward and away from their respective operative positions whereby the first and second wipers may be driven independently of each other by said driving member so that, as desired, either, neither or both of the wipers may be actuated.

7. A wiper arrangement for wiping opposite sides of a pane of transparent material or the like, comprising, in combination, a driving member mounted for turning movement and having at least two driving engaging portions; a first driven member having a first driven engaging portion and being mounted for turning movement and for axial movement toward and away from an operative position wherein said first driven engaging portion of said first driven member is in engagement with one of said driving engaging portions of said driving member so that said driving member drives said first driven member; first wiping means for wiping one side of the pane and connected to said first driven member for turning movement therewith; a second driven member having a second driven engaging portion and being mounted for turning movement and for axial movement toward and away from an operative position wherein said second driven engaging portion of said second driven member is in engagement with the other of said driving engaging portion of said driving member so that said driving member drives said second driven member; second wiping means for wiping the other side of the pane and connected to said second driven member for turning movement therewith; and first and second moving means connected to said first and second driven members, respectively, for moving the same axially toward and away from their respective operative positions whereby said first and second wiping means may be driven independently of each other by said driving member so that, as desired, either, neither or both of said wiping means may be actuated.

8. A wiper arrangement for wiping opposite sides of a pane of transparent material or the like, comprising, in combination, a driving member mounted for turning movement and having at least two driving engaging portions; a first driven menber having a first driven engaging portion and being mounted for turning movement and for axial movement toward and away from an operative position wherein said first driven engaging portion of said first driven member is in engagement with one of said driving engaging portions of said driving member so that said driving member drives said first driven member; first wiping means for wiping one side of the pane and connected to said first driven member for turning movement therewith; a second driven member having a second driven engaging portion and being mounted for turning movement and for axial movement toward and away from an operative position wherein said second driven engaging portion of said second driven member is in engagement with the other of said driving engaging portions of said driving member so that said driving member drives said second driven member; second wiping means for wiping the other side of the pane and connected to said second driven member for turning movement therewith; and first and second moving means arranged on the same side of the pane and connected to said first and second driven members, respectively, for moving the same axially toward and away from their respective operative positions whereby said first and second wiping means may be driven independently of each other by said driving member so that, as desired, either, neither or both of said wiping means may be actuated.

9. A wiper arrangement for wiping opposite sides of a pane of transparent material or the like, comprising, in combination, a driving member adapted for turning movement about a turning axis traversing the plane of the pane and having at least two driving engaging portions; a first driven member having a first driven engaging portion and being adapted for turning movement about said axis and for reciprocating movement toward and away from an operative position wherein said first driven engaging portion of said first driven member is in engagement with one of said driving engaging portions of said driving member so that said driving member drives said first driven member; first wiping means for wiping one side of the pane and connected to said first driven member for turning movement therewith; a second driven member having a second driven engaging portion and being adapted for turning movement about said axis and for reciprocating movement toward and away from an operative position wherein said second driven engaging portion of said second driven member is in engagement with the other of said driving engaging portions of said driving member so that said driving member drives said second driven member; second wiping means for wiping the other side of the pane and connected to said second driven member for turning movement therewith; and first and second moving means arranged on the same side of the pane and connected to said first and second driven members, respectively, for moving the same toward and away from their respective operative positions whereby said first and second wiping means may be driven independently of each other by said driving member so that, as desired, either, neither or both of said wiping means may be actuated.

References Cited in the file of this patent

UNITED STATES PATENTS

| | | |
|---|---|---|
| 1,739,806 | Sparling | Dec. 17, 1929 |
| 1,860,281 | Gentil | May 24, 1932 |
| 2,313,201 | Klein | Mar. 9, 1943 |

FOREIGN PATENTS

| | | |
|---|---|---|
| 579,030 | Germany | Aug. 15, 1931 |
| 517,478 | Great Britain | Jan. 31, 1940 |
| 744,800 | Germany | Jan. 26, 1944 |